United States Patent [19]

Kataoka et al.

[11] Patent Number: 4,802,153
[45] Date of Patent: Jan. 31, 1989

[54] OPTICAL INFORMATION PROCESSOR AND METHOD FOR ACCESSING ROTATING RECORD CARRIER UTILIZING ACOUSTO-OPTIC LIGHT DEFLECTOR INCLUDING HOLDING A FOCUS ERROR SIGNAL DURING TRACK JUMPING

[75] Inventors: Keiji Kataoka, Kawagoe; Takeshi Maeda, Kokubunji; Yoshito Tsunoda, Mitaka, all of Japan

[73] Assignee: Hitachi, Ltd., Tokyo, Japan

[21] Appl. No.: 842,200

[22] Filed: Mar. 21, 1986

[30] Foreign Application Priority Data

Mar. 22, 1985 [JP] Japan ................. 60-55829

[51] Int. Cl.⁴ ............................................. G11B 7/09
[52] U.S. Cl. ....................................... 369/45; 369/44; 369/46; 369/112; 358/342
[58] Field of Search ............................ 369/44–46, 369/32, 112, 120–122, 33; 358/342; 350/96.11–96.14, 358

[56] References Cited

U.S. PATENT DOCUMENTS

| | | | |
|---|---|---|---|
| 4,047,795 | 9/1977 | Hughes et al. | 350/96.14 |
| 4,056,304 | 11/1977 | Phillips | 350/96.14 |
| 4,425,023 | 1/1984 | Matsumoto et al. | 369/122 X |
| 4,470,661 | 9/1984 | Matsumoto | 350/96.13 |
| 4,530,573 | 7/1985 | Wolkstein | 350/96.13 X |
| 4,613,963 | 9/1986 | Hirano | 369/44 |
| 4,625,303 | 11/1986 | Shikama et al. | 369/120 X |
| 4,654,838 | 3/1987 | Sugiki | 369/120 X |
| 4,672,187 | 6/1987 | Fujita et al. | 369/112 X |

FOREIGN PATENT DOCUMENTS

| | | |
|---|---|---|
| 0174008 | 3/1986 | European Pat. Off. ........... 369/45 |
| 59-79441 | 5/1984 | Japan . |
| 59-107431 | 6/1984 | Japan . |

OTHER PUBLICATIONS

E. G. Lean et al., IBM Technical Disclosure Bulletin, "Integrated Optic Read-Write Head", vol. 15, No. 8, 1/73, p. 2630.
Electronic Design, "Optical Waveguide Developed as a Key to IC Light Devices", 4/72, vol. 8, p. 30.
Suhara et al., "High-Performance Focusing Grating Coupler Fabricated by Electron-Beam Writing", 4/84.
Verber et al., "An Integrated Optical Comparator for Multichannel Data", 9/79, Proceedings of the Optical Communication Conference, pp. 13/6-1-3.

Primary Examiner—Raymond F. Cardillo
Assistant Examiner—W. R. Young
Attorney, Agent, or Firm—Antonelli, Terry & Wands

[57] ABSTRACT

Accessing method and an apparatus therefor in an optical disc apparatus having an acousto-optic light deflector for deflecting a light spot to a different address or different track on an optical disc are disclosed. An autofocus signal is held at a constant level for a predetermined period when the acousto-optic light deflector deflects the light spot. Thus, an affect caused by coexistence of a plurality of acoustic frequencies in the acoustic-optic device is eliminated and fast light accessing is attained.

20 Claims, 5 Drawing Sheets t=t₀ t=t₁ t=t₂

OPTICAL INFORMATION PROCESSOR AND METHOD FOR ACCESSING ROTATING RECORD CARRIER UTILIZING ACOUSTO-OPTIC LIGHT DEFLECTOR INCLUDING HOLDING A FOCUS ERROR SIGNAL DURING TRACK JUMPING

BACKGROUND OF THE INVENTION

The present invention relates to an accessing method for rapidly retrieving a desired signal on a record carrier such as an optical disc and an optical information processor.

One example of apparatus which can non-contact access a desired signal on a rotating record carrier is an optical disc apparatus. One such apparatus is described in Hitachi Review, Vol. 33, No. 3, pages 109–114, June 1984. In this apparatus, a mechanical light deflector for mechanically displacing a mirror is used to move a light spot from one track to another. Such a mechanical light deflector cannot attain fast light deflection of 0.1 millisecond or shorter, and it is disadvantageous in attaining fast accessing.

SUMMARY OF THE INVENTION

It is an object of the present invention to provide an accessing method and an apparatus therefor which enable fast retrieval of signals at different addresses or on different tracks on a rotating record carrier such as an optical disc.

In accordance with the present invention, an acousto-optic light deflector is used instead of a conventional mechanical light deflector such as a galvano-mirror light deflector. When a light is deflected at a high speed by the acousto-optic light deflector, an acoustic frequency which propagates in an acousto-optic device must be changed at a high speed. As a result, instantaneously a single acoustic frequency is not produced but a plurality of acoustic frequencies exist in an acoustic device area through which the light propagates and a wave front of the light emitted from the device is distorted. Thus, when a light spot is to be deflected from one track to another by using the acousto-optic light deflector, the light spot is not well focused on the optical disc during the movement of the light spot from the one track to another and a control signal such as an auto-focus control signal for controlling an irradiation point of the light spot on the optical disc may become abnormal. The auto-focus control signal is supplied to an auto-focus actuator such as a voice coil which auto-focuses an objective lens. The abnormal auto-focus signal detected during the fast light deflection by the acousto-optic light deflector causes an abnormal oscillation of the auto-focus actuator since a long time is required before the abnormal oscillation ceases, the fast light accessing is not attained even if the acousto-optic light deflector which enables the fast light deflection is used.

The present invention is based on the finding of a problem encountered in the fast light deflection by the acousto-optic light deflector. In accordance with the present invention, the control signal such as the auto-focus signal is kept at a signal level immediately before the accessing during the movement of the light spot, that is, during the existence of a plurality of acoustic frequencies in the acoustic device in the fast access period in which the light spot is deflected from one track to another by the acousto-optic light deflector.

DESCRIPTION OF THE PREFERRED EMBODIMENTS

Figure 1:
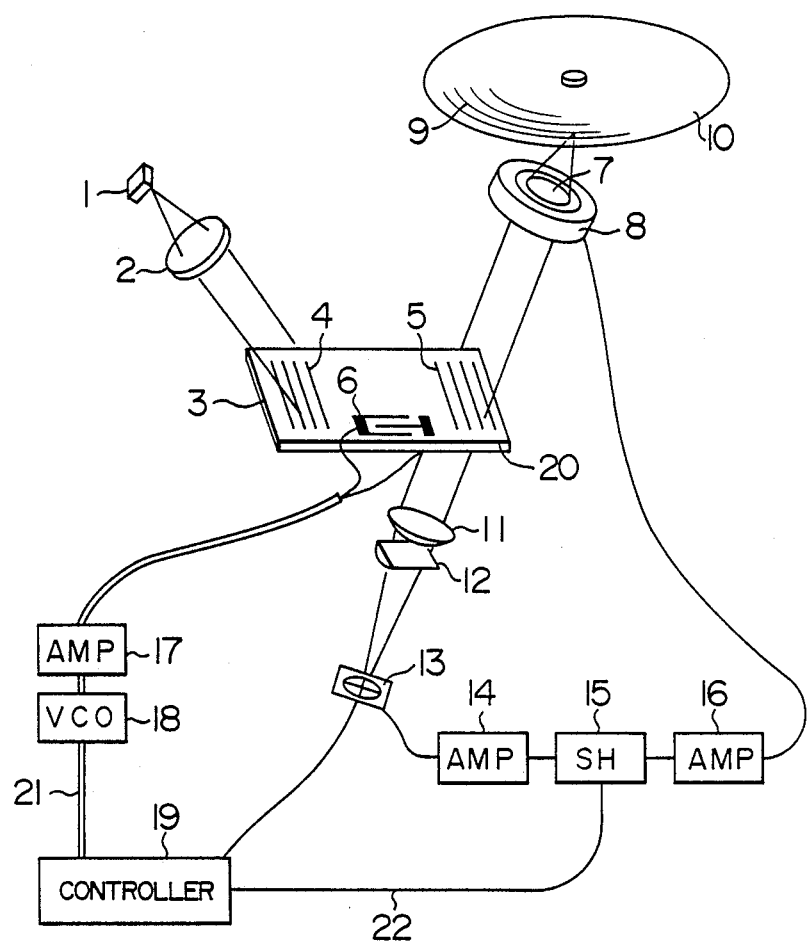
FIG. 1 is a schematic diagram of one embodiment of an optical disc apparatus of the present invention.

One embodiment of the present invention is explained with reference to FIG. 1. A laser beam emitted from a semiconductor laser 1 is collimated by a coupling lens 2 and directed to a device 3. The device 3 as an acousto-optic light deflector may be a Y-cut LiNb $O_3$ crystal having a Ti-diffused optical waveguide layer 20 formed on a crystal surface thereof. A grating 4 is formed on the optical waveguide layer 20 and the laser beam directed to the grating 4 through the lens 2 is directed into the optical waveguide layer 20 and taken out of the device by an output grating 5. An objective lens 7 is focus-adjusted by a voice coil 8 to focus a fine light spot onto an optical disc 10. The optical disc 10 may comprise a transparent substrate, a recording film formed thereon and a protective layer formed thereon as required, and the recording film has concentric or spiral tracks 9. A reflection light from the optical disc 10 is directed to a quadrant photo-detector which comprises isolated four sectors for photo-detection, through a lens 11 and a cylindrical lens 12. The laser 1, lenses 2, 7, 11 and 12 and photo-detector 13 form an optical head which may be mounted in a housing and is movable radially of the optical disc by an actuator such as linear motor or stepping motor. The auto-focus control unit which uses the cylindrical lens and the quadrant photo-detector has been known, for example, by U.S. Pat. No. 4,293,944. The output of the quadrant photo-detector is appropriately processed and a difference between two diagonal pairs of photo-detectors is used as an auto-focus control signal which is applied to an amplifier 14, and a sum of the outputs of the four photo-detectors is used as an information reproducing signal which is applied to a control circuit 19. Numeral 6 on the device 3 denotes an electrode for generating a surface acoustic wave (SAW). The surface acoustic wave (SAW) which propagates on the device 3 (optical waveguide layer 20) is used as a light deflector. A deflection angle of the light emitted from the device changes by $\delta\theta$ in accordance with a frequency change $\delta f$ of a voltage applied to the electrode 6.

$$\delta\theta = \lambda/v \cdot \delta f \tag{1}$$

where v is a sound velocity and $\lambda$ is a light wavelength.

In the present embodiment, the SAW device may be used as a tracking control device to track the light spot on the optical disc so that it is always on a desired track. A tracking error signal which indicates a deviation between the track and the light spot may be detected by the output of the quadrant photo-detector 13 as taught by the U.S. Patent mentioned above. The detected tracking error signal is sent to a voltage controlled oscillator (VCO) 18 from the controller 19 and the VCO 18 changes the frequency in accordance with the tracking error signal. The output of the VCO 18 is applied to an amplifier (AMP) 17 which supplies a voltage to the electrode 6 to change the light deflection angle as shown in the formula (1). In this manner, a tracking servo loop for correcting the tracking error is constructed. The frequency change of the VCO output waveform applied to the device 6 during the tracking control is low in speed and small in magnitude. Thus, in this case, no harmful effect appears on the light spot.

The acousto-optic light deflection device 6 is also used to deflect the light spot from one track to another. A distance $\delta T$ of movement of the light spot is given by $$\delta\theta = F\delta\theta = \lambda/v \cdot F \cdot \delta f$$

where F is a focal distance of the objective lens.

When the fast light deflection is carried out to allow fast access from one track to another, a problem which is inherent to the SAW arises as will be explained with reference to FIGS. 2 and 3. FIG. 2 shows a timing chart of signals in the fast light deflection for the fast access. A voltage waveform 23 shown in FIG. 2 is applied to the voltage controlled oscillator (VCO) 18 from the controller 19 through a signal line 21 shown in FIG. 1. When a target track address is given, the controller 19 compares it with a current or present track address at which the light spot is located, determines the distance $\delta T$ of movement based on the address difference, and selectively applies the signal 23 having an amplitude corresponding to the distance of movement to the VCO 18, instead of the signal corresponding to the tracking error signal. The deflection angle by the acousto-optic deflection device 6 is definite and cannot cover all tracks on the optical disc but covers only 20–30 tracks at most. Accordingly, when the light spot is to be deflected beyond this range, the entire optical head is first moved radially of the optical disc by an actuator (not shown) to locate the light spot in the vicinity of the target address (within the range of track selection by the acousto-optic light deflection device), the difference between the track address on which the light spot is located and the target track address is determined, and the fast light deflection by the acousto-optic light deflection device 6 is carried out to correct the difference.

Figure 2:
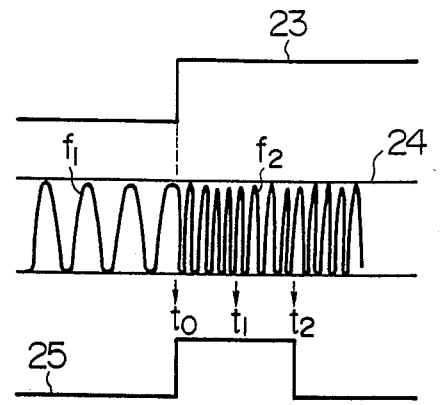
FIGS. 2 and 3a–3c illustrate an operation of the acousto-optic light deflector of the present invention.
Figure 3A:
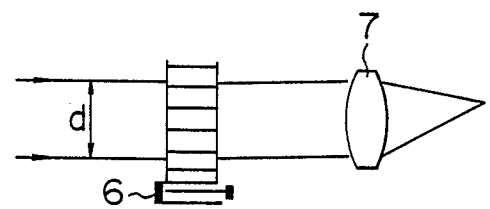
Figure 3B:
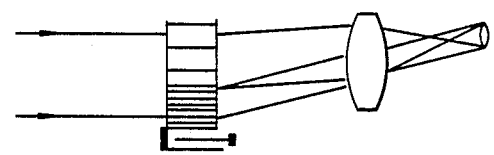
Figure 3C:
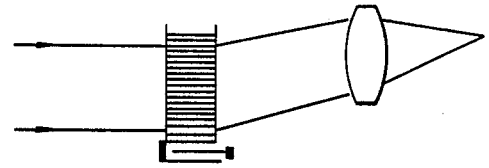

The output waveform 24 of the VCO abruptly changes from a sine wave of frequency $f_1$ to frequency $f_2$ in response to the signal 23 from the controller 19. FIGS. 3a–3c show surface acoustic waves at time $t_0$ which is immediately before the fast light deflection, time $t_1$ shortly after the fast light deflection and time $t_2$ further after the fast light deflection, as shown in the time chart of FIG. 2. Let us assume that a laser beam having a width d in applied to the surface acoustic wave. At the time $t_0$, the surface acoustic wave of the frequency $f_1$ is generated over the entire light width d as shown in FIG. 3a, and the light spot is well focused by the objective lens 7 to a position corresponding to the frequency $f_1$. At the time $t_1$ defined by $t_1 - t_0 < d/v$, where v is a sound velocity of the surface acoustic wave, surface acoustic waves having frequencies $f_0$ and $f_1$ coexist in the light width d as shown in FIG. 3b. As a result, the light spot is not well focused by the objective lens 7 but it is blurred.

At the time $t_2$ defined by $t_2 - t_0 < d/v$, the surface acoustic wave having the frequency $f_2$ is generated throughout the light width d as shown in FIG. 3c and a well focused light spot appears at a deflection position corresponding to the frequency $f_2$.

As described above, the light spot on the optical disc is not well focused at the time $t_1$ between the times $t_0$ and $t_2$, and the auto-focus control signal explained in FIG. 1 is also not properly obtained. If it is applied to the auto-focus actuator 8, the auto-focus actuator may operate abnormally. In the present embodiment, as shown by a waveform 25 in FIG. 2, the controller 19 generates a pulse which is at a high level for a period of the time $t_0$ to the time $t_2$, that is, at least a period of $d/v$ in synchronism with the signal 23 and applies it to a sample-hold circuit 15 shown in FIG. 1. Thus, the sample-hold circuit 15 samples the auto-focus control signal at the time $t_0$, holds the sampled signal for the period in which the signal 25 is at the high level, and drives the auto-focus actuator 8 through the amplifier 16. At the time $t_2$, it releases the holding so that the detected auto-focus control signal is applied, as it is, to the auto-focus actuator 8 through the amplifier 16.

Figure 4A:
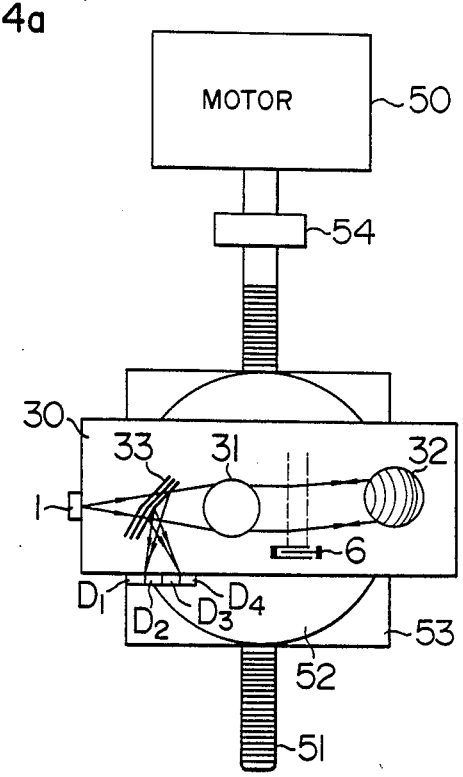
FIGS. 4a, 4b and 5 show another embodiment of the optical disc apparatus of the present invention.
Figure 4B:
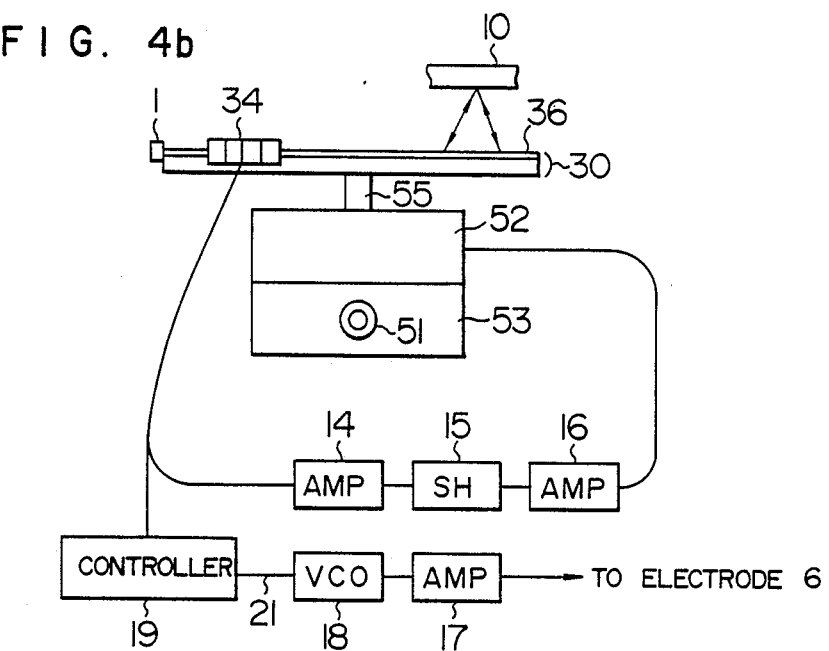

FIGS. 4a and 4b show another embodiment of the present invention. FIG. 4a is a plan view and FIG. 4b is a side view. In the present embodiment, an acousto-optic light deflector, a beam splitter and a lens of an optical head are integrated. Numeral 30 denotes a dielectric crystal such as a $LiNbO_3$ crystal. A surface of the crystal 30 is Ti-diffused and has a slightly higher index of refraction than that of a surrounding medium so that it functions as an optical waveguide layer.

A light emitted from a semiconductor laser 1 mounted at an end of the crystal 30 is directed to the optical waveguide layer 36 by edge coupling and a fine spot is formed on a disc 10 by a coupling lens 31 and an objective lens 32 both arranged above the optical waveguide layer. The coupling lens 31 may be a known geodesic lens or a waveguide lens such as a diffraction grating. The objective lens may be a lens including a known diffraction grating. Numeral 6 denotes an electrode for exciting a surface acoustic wave. Owing to the method of changing a frequency of the surface acoustic wave, the light is diffracted by the surface acoustic wave so that the fine spot formed on the disc follows the track on the disc.

The light reflected by the disc passes through the objective lens 32 and the coupling lens 31, is reflected by a diffraction grating 33 divided into two parts, and is directed to a linearly arranged quadrant photo-detector 34. The laser beam from the linear portion on one side of the diffraction grating 33 is directed to two photo-detectors on one side of the linearly arranged quadrant photo-detector, and the laser beam from the portion on the other side of the diffraction grating is directed to the two other photo-detectors. A principle of operation of the diffraction grating 33 is explained with reference to FIG. 5. A focus error signal is detected in the following manner. If the light spot focused by the objective lens is exactly on the disc surface (recording surface), the light reflected by the disc converges at a point 0 in FIG. 5. A portion of the light converged at the point 0 is reflected by the diffraction grating 33 and detected by the quadrant photo-detector 34. In this case, the laser beam is directed to a position between $D_1$ and $D_2$ and a position between $D_3$ and $D_4$ on the quadrant photo-detector 34, as shown by solid lines in FIG. 5.

Figure 5:
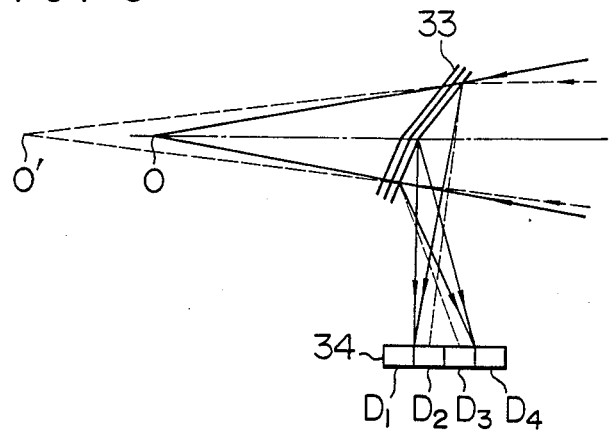

If the focus error is such that a distance between the objective lens and the disc is smaller than a correct distance, the laser beam reflected by the disc converges at a point 0' spaced from the point 0 as shown by broken lines in FIG. 5. In this case, since the laser beam is directed to the photo-detector 34 in a manner shown by broken lines, there is a difference between photo-detection outputs by the photo-detectors $D_1$ and $D_2$, and the photo-detectors $D_3$ and $D_4$. A focus error signal AF is represented by $$AF = V(D_1) + V(D_4) - (V(D_2) + V(D_3)) \quad (2)$$

where $V(D_1)$, $V(D_2)$, $V(D_3)$ and $V(D_4)$ are photo-detection output voltages of the photo-detectors $D_1$, $D_2$, $D_3$ and $D_4$. In the present case, $AF < 0$.

If the focus error is such that the distance between the objective lens and the disc is larger than the correct distance, then $AF > 0$.

In this manner, the focus error signal is detected.

A tracking signal TR is represented by $$TR = V(D_1) + V(D_2) - (V(D_3) + V(D_4)) \quad (31)$$

If the light spot is slightly deviated from the track on the optical disc, light intensities at the opposite ends of the diffraction grating by the light reflected from the disc are not equal, and the direction of the tracking error can be detected by a polarity of TR in the formula (3). The tracking control is effected by driving the acousto-optic light deflector 6 by the tracking signal TR as is done in the embodiment of FIG. 1. In the auto-focus control, the focus signal AF is detected based on an output of the quadrant photo-detector 34, and an auto-focus actuator 52 for driving the crystal 30 is driven through an amplifier 14, a sample-hold circuit 15 and an amplifier 16, as is done in the embodiment of FIG. 1. The acousto-optic light deflector 6 is driven in the same manner as that of the embodiment of FIG. 1. The auto-focus actuator 52 drives the crystal 30 normally to the disc surface to automatically correct the focus error.

If the track selection for the disc is beyond the range in which the acousto-optic light deflector 6 can select, the crystal 30 is moved in a pitch direction of the tracks (radially of the disc). A motor 50 rotates a screw 51 supported by a bearing 54 so that the crystal 30 on a support block 53 and the entire auto-focus actuator 52 are moved in the pitch direction of the tracks.

Figure 6:
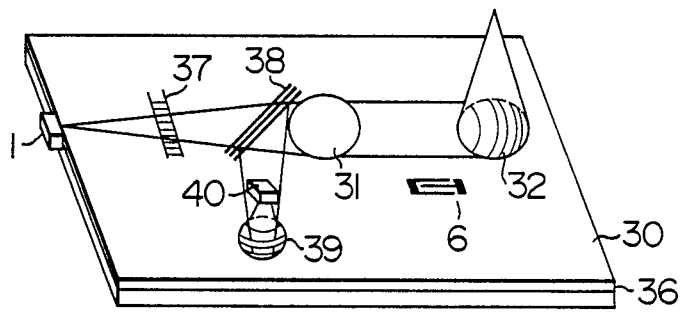
FIGS. 6, 7, 8 and 9a–9c show another embodiment of the present invention.

FIG. 6 shows a perspective view of another embodiment of the present invention. A laser beam emitted from a semiconductor laser 1 passes through a 3-spot generating diffraction grating 37 and three fine spots are formed on a disc by a coupling lens 31 and an objective lens 32. A light reflected from a disc 10 traces the reverse path, is reflected by a beam splitting diffraction grating 38, is emitted from a waveguide plane of a diffraction grating lens 39 and is directed to a photodetector 40 shown in FIG. 7.

Figure 7:
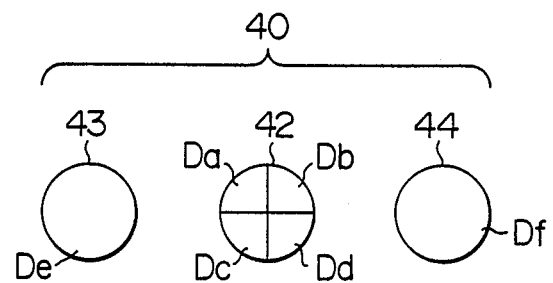
Figure 8:
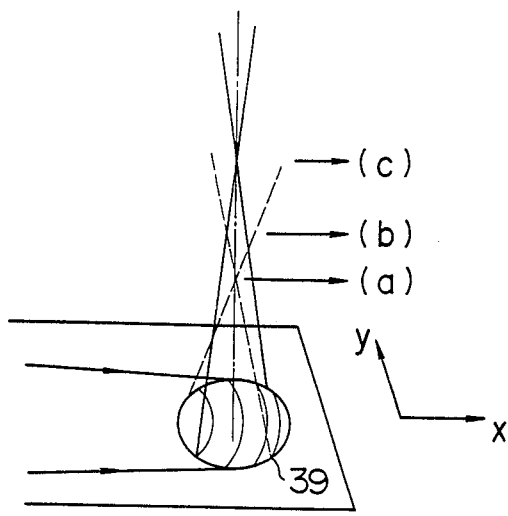
Figure 9A:
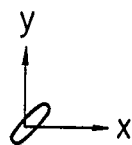
Figure 9B:
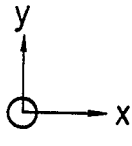
Figure 9C:
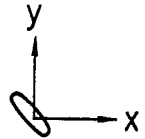

Side spots are detected by photo-detectors 43 and 44 of FIG. 7 and the detection outputs are used to detect a tracking signal. A main spot is detected by a quadrant photo-detector 42 of FIG. 7 and the detection signal is used to detect an auto-focus signal and an information reproducing signal. FIG. 8 shows how the main spot is focused by the lens 39. Light intensity patterns at points a, b and c of FIG. 8 are shown in FIGS. 9a, 9b and 9c, respectively. The auto-focus signal is produced by appropriately differentiating the outputs of the quadrant photo-detector. The acousto-optic light deflector 6 and the auto-focus control are driven in the same manner as that of the embodiment of FIG. 4.

As described hereinabove, the present invention can eliminate the affect by the abnormal signal generated in the fast light deflection and enables the fast light accessing. Since the present invention utilizes the optical waveguide, optical parts such as optical waveguide lens and optical waveguide grating can be integrated by exposure and developing processes at a high accuracy. Thus, the optical head which has a smaller number of adjusting parts and is of low cost and compact can be provided.

What is claimed is:

1. An accessing method in an auto-focus control system for irradiating a light spot onto a recording surface of a rotating record carrier having tracks formed thereon, photo-electrically converting a light beam reflected from the record carrier, producing a focus error signal indicating a deviation of a focus point of the light spot from the recording surface of the record carrier based on the photo-electrically converted output and controlling the focus point of the light spot by the focus error signal so that the focus point of the light spot coincides with the recording surface, comprising the steps of:

deflecting the light spot by an acousto-optic light deflector; and holding, during movement of the light spot by said acousto-optic light deflector from said one track to another, the focus error signal in the state prior to said movement.

2. An accessing method according to claim 1, wherein said acousto-optic light deflector is a light deflector which uses a surface acoustic wave.

3. An accessing method according to claim 2, wherein said focus error signal is held for at least d/v, where d is a light width directed to said light deflector and v is a sound velocity of the acoustic surface wave.

4. An accessing method according to claim 1, wherein a tracking error signal indicating a deviation of said light spot from said track is derived from said photo-electrically converted output, and said acousto-optic light deflector is driven by said tracking error signal so that said light spot follows the track.

5. An optical information processor comprising;

optical means for directing a light spot to a recording surface of a rotating record carrier having tracks formed thereon;

focus control means for producing a focus error signal indicating a deviation of a focus point of the light spot from the recording surface based on a light beam reflected by said recording surface and controlling the focus point of the light spot in accordance with the focus error signal so that the focus point of the light spot coincides with the recording surface;

an acousto-optic light deflector arranged in an optical path of said optical means for deflecting the light spot;

first means for supplying signals of different frequencies to said acousto-optic light deflector to deflect the light spot from one track to another track; and second means arranged in said focus control means for holding said focus error signal for said one track for a period of movement of the light spot from said one track to said other track by said light deflector.

6. An optical information processor according to claim 5, wherein said acousto-optic light deflector is a light deflector having an electro-optic crystal having an optical waveguide layer formed on a surface thereof and an electrode arranged thereon, and a light beam passing through the optical waveguide layer is deflected by a surface acoustic wave generated by a voltage applied to the electrode.

7. An optical information processor according to claim 6, further comprising a grating formed on said optical waveguide layer for guiding the light beam into said optical waveguide layer.

8. An optical information processor according to claim 6, further comprising a grating formed on said optical waveguide layer for taking the deflected light beam out of said optical waveguide layer.

9. An optical information processor according to claim 6, further comprising a grating lens formed on said optical waveguide layer for focusing the deflected light beam onto the recording surface of the record carrier.

10. An optical information processor according to claim 9, further comprising a grating formed on said optical waveguide layer to isolate the light beam directed to said record carrier from the light beam reflected by said record carrier.

11. An optical information processor according to claim 5, wherein said first means includes an oscillator for generating a signal of a frequency corresponding to an amplitude of an input signal.

12. An optical information processor according to claim 11, further comprising means for generating a pulse of a predetermined width in synchronism with the change of the amplitude of the input signal to said oscillator, and the hold operation of said second means is controlled by said pulse.

13. An optical information processor according to claim 5, wherein a tracking error signal indicating a deviation of the light spot from the track is produced based on the light beam reflected from said recording surface, and said acousto-optic light deflector is driven by the tracking error signal so that the light spot follows the track.

14. An optical information processor comprising;
light irradiation means having an acousto-optic light deflector for irradiating a light spot to a recording surface of an optical disc and deflecting the optical spot;
focus control means for producing a focus error signal indicating a deviation of a focus point of the light spot from the recording surface in accordance with a light flux reflected from the recording surface and controlling the focus point of the light spot by said focus error signal so that the focus point of the light spot coincides with the recording surface;
first means for supplying to said acousto-optic light deflector a signal having a frequency representing a magnitude of an input signal;
second means for producing a pulse of a predetermined width in synchronism with a change of the magnitude of the input signal to said first means; and
third means arranged in said focus control means for receiving said focus error signal and said pulse and holding said focus error signal at a constant level for a period of said pulse.

15. An optical information processor according to claim 14, wherein said acousto-optic light deflector is a light deflector having an electo-optic crystal having an optical waveguide layer formed on a surface thereof and an electrode arranged thereon, and a light beam passing through the optical waveguide layer is deflected by a surface acoustic wave generated by a voltage applied to the electrode.

16. An optical information processor according to claim 15, further comprising a grating lens formed on said optical waveguide layer for focusing the deflected light beam onto the recording surface of the record carrier.

17. An optical information processor according to claim 16, further comprising a grating formed on said optical waveguide layer to isolate the light beam directed to said record carrier from the light beam reflected by said record carrier.

18. An optical information processor according to claim 14, further comprising a quadrant photo-detector for detecting a light reflected from the recording surface, wherein said focus error signal is derived from outputs of said quadrant photo-detector.

19. An optical information processor according to claim 14, wherein a tracking error signal indicating a deviation of the light spot from the track is produced based on the light beam reflected from said recording surface, and said acousto-optic light deflector is driven by the tracking error signal so that the light spot follows the track.

20. An optical information processor according to claim 19, further comprising a quadrant photo-detector for detecting a light beam reflected from said recording surface, wherein said focus error signal and a tracking error signal are derived from outputs of said quadrant photo-detector.

* * * * *